United States Patent
Syvanne (10) Patent No.: US 7,127,739 B2
(45) Date of Patent: Oct. 24, 2006

(54) HANDLING INFORMATION ABOUT PACKET DATA CONNECTIONS IN A SECURITY GATEWAY ELEMENT

(75) Inventor: Tuomo Syvanne, Vantaa (FI)

(73) Assignee: Stonesoft OY, Helsinki (FI)

(*) Notice: Subject to any disclaimer, the term of this patent is extended or adjusted under 35 U.S.C. 154(b) by 857 days.

(21) Appl. No.: 09/962,722

(22) Filed: Sep. 21, 2001

(65) Prior Publication Data
US 2002/0112188 A1    Aug. 15, 2002

(30) Foreign Application Priority Data
Feb. 12, 2001  (FI)  ................................. 20010256

(51) Int. Cl.
H04L 9/00 (2006.01)
G06F 15/16 (2006.01)
G06F 11/30 (2006.01)

(52) U.S. Cl. .............................. 726/12; 726/4; 709/224

(58) Field of Classification Search ................ 713/150, 713/153, 154, 160, 161, 200, 201; 709/223, 709/224, 227, 228
See application file for complete search history.

(56) References Cited

U.S. PATENT DOCUMENTS

| | | | |
|---|---|---|---|
| 5,577,209 A | | 11/1996 | Boyle et al. |
| 5,606,668 A | * | 2/1997 | Shwed ........................ 713/201 |
| 5,781,550 A | * | 7/1998 | Templin et al. ............. 370/401 |
| 5,835,726 A | * | 11/1998 | Shwed et al. ............... 709/229 |
| 5,905,859 A | | 5/1999 | Prorock et al. |
| 5,907,602 A | | 5/1999 | Peel et al. |
| 6,044,402 A | | 3/2000 | Davis et al. |

(Continued)

FOREIGN PATENT DOCUMENTS

| | | |
|---|---|---|
| EP | WO 98/07088 | 2/1998 |
| EP | 0 856 974 A2 | 8/1998 |
| EP | 0 909 072 A2 | 4/1999 |
| WO | WO 00/05852 | 2/2000 |
| WO | WO 00/62167 | 10/2000 |

OTHER PUBLICATIONS

Bellovin, Steven M., "Network Firewalls", IEEE Communications Magazine, IEEE Service Center, Piscataway, J.J., U.S. vol. 32, No. 9, Sep. 1, 1994.

(Continued)

*Primary Examiner*—Christopher Revak
(74) *Attorney, Agent, or Firm*—Ronald Craig Fish, A Law Corporation (57) ABSTRACT

A method (400, 610) for handling information about packet data connections arriving at a security gateway element, in order to have in a connection data structure information about packet data connections in accordance with current screening information is presented. In the method, data packet header information about packet data connections in accordance with first screening information is stored (401) in said connection data structure, and updated screening information, said updated screening information forming either by itself or in connection with said first screening information second screening information, is being received (402). After receiving said updated screening information, entries of said connection data structure are compared (403) to said second screening information, resulting in a classification of said entries as entries representing packet data connections in accordance with said second screening information and as entries representing packet data connections in conflict with said second screening information. Corresponding security gateway element, management system, computer program and connection data structures are also presented.

33 Claims, 8 Drawing Sheets

U.S. PATENT DOCUMENTS

| | | | | |
|---|---|---|---|---|
| 6,092,194 | A * | 7/2000 | Touboul | 713/200 |
| 6,130,924 | A | 10/2000 | Rosenzweig et al. | 375/350 |
| 6,154,844 | A * | 11/2000 | Touboul et al. | 713/201 |
| 6,158,010 | A | 12/2000 | Moriconi et al. | |
| 6,167,520 | A * | 12/2000 | Touboul | 713/200 |
| 6,480,962 | B1 * | 11/2002 | Touboul | 713/200 |
| 6,510,509 | B1 * | 1/2003 | Chopra et al. | 712/13 |
| 6,606,710 | B1 * | 8/2003 | Krishnan et al. | 726/13 |
| 6,611,875 | B1 * | 8/2003 | Chopra et al. | 709/245 |
| 6,631,466 | B1 * | 10/2003 | Chopra et al. | 712/300 |
| 6,650,660 | B1 * | 11/2003 | Koehler et al. | 370/503 |
| 6,691,168 | B1 * | 2/2004 | Bal et al. | 709/238 |
| 6,804,780 | B1 * | 10/2004 | Touboul | 713/181 |

OTHER PUBLICATIONS

Hari, Adiseshu, et al., "Detecting and Resolving Packet Filter Conflicts", Proceedings IEEE Infocom 2000, Tel Aviv, Israel, Mar. 26-30, 2000., vol. 3 of 3 Conf. 19, ISBN: 0-7803-5881-3.

* cited by examiner

HANDLING INFORMATION ABOUT PACKET DATA CONNECTIONS IN A SECURITY GATEWAY ELEMENT

BACKGROUND OF THE INVENTION

1. Field of the Invention

The invention relates in general to handling in a security gateway element a connection data structure, in which information about allowed packet data connections is stored. In particular the invention relates to handling the connection data structure in a flexible way.

2. Description of Related art

The local networks of various organizations and enterprises are nowadays connected to the public Internet. To protect a local network, special gateway is usually used to connect the local network to a public network. This special gateway is often called a security gateway or a firewall, and the purpose of a security gateway is to prevent authorized access to the local network. Typically there is need to restrict access to a local network from a public network and/or to restrict access from the local network to the public network or further networks connected to the public network. On data packet level this means that data packets, which are entering and/or exiting a local network, are screened or filtered in a security gateway. In addition to filtering data packets a security gateway may secure data packets transmitted between, for example, some communication entities. In this case the security gateway is both a firewall and a VPN (Virtual Private Network) gateway.

Figure 1:
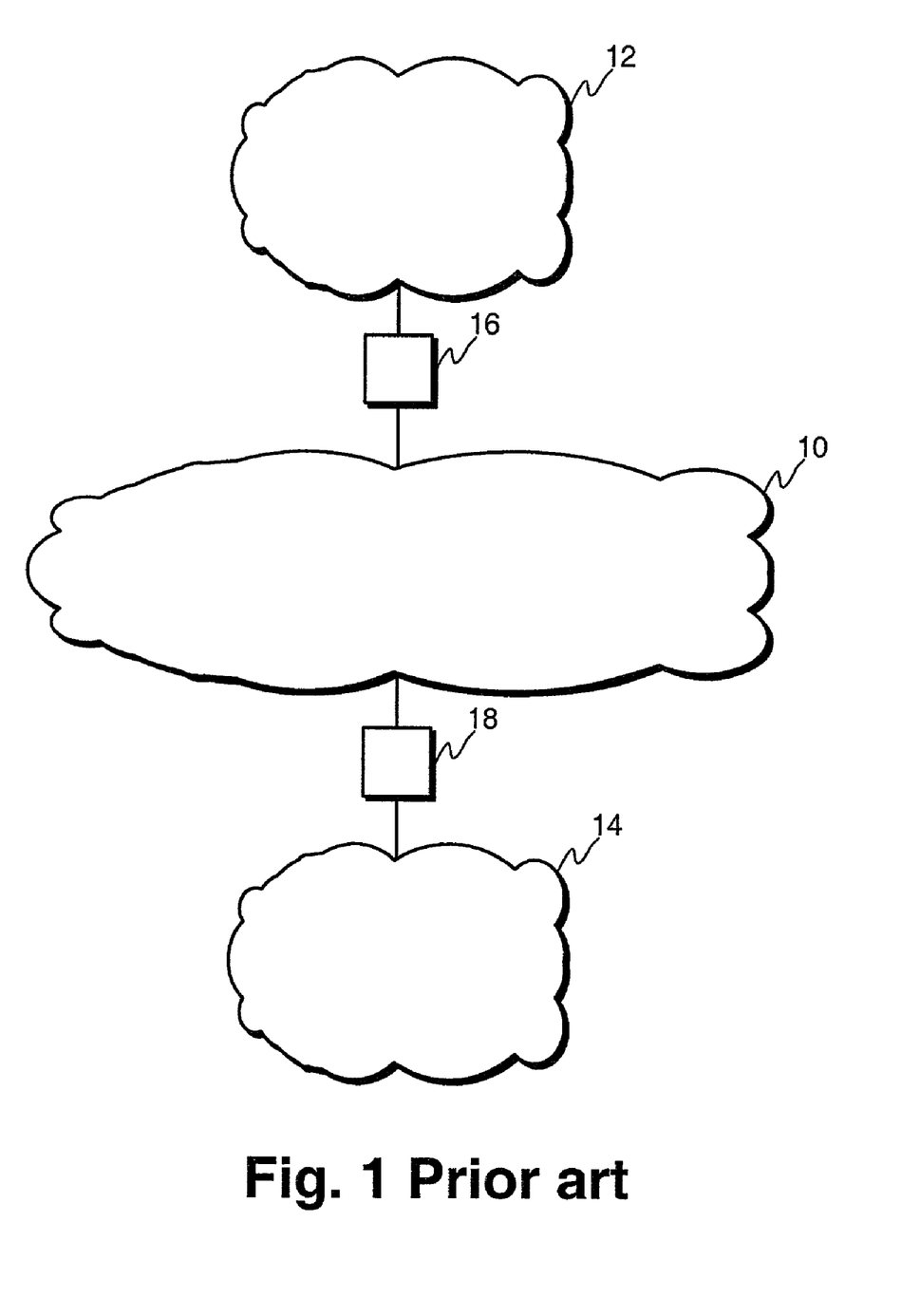
FIG. 1 illustrates two local networks connected to a public network via security gateways.

FIG. 1 illustrates an example with a first local network 12, a second local network 14 and a public network 10. The public network may be, for example, the Internet. The local networks 12, 14 are connected to the public network 10 via security gateway elements 16 and 18, respectively. A security gateway element 16, 18 may be implemented as one network node (server) or as a cluster of nodes. Term security gateway element is used in this description to refer to a network node or to a cluster of network nodes, where stateful (see below) data packet screening is performed and which connects at least two networks to each other. A security gateway element may be, for example, a plain firewall node screening packets or a firewall node provided with VPN functionality, or a cluster of such nodes.

Screening of data packets in a network element may be stateless or stateful. Stateless screening refers to packet filtering, where each packet is handled according to a set of rules (or other screening information, see below) without any information about history of packets. Stateless screening is typically used, for example, in routers. Stateful screening refers to a situation, where a data packet initiating a packet data connection is accepted using a set of rules, and consequently information about an accepted packet data connection is stored in the network element for handling the rest of the data packets belonging to the opened packet data connection. Security gateways typically perform stateful screening of data packets. The main reason for using stateful screening is security. Typically, it is required to restrict access from a public network to a local network while allowing entities in the local network to access public network. In stateless screening there must be rules, which allow possible reply packets from the public network to the local network to pass a network element. Many other data packets than proper reply packets may be accepted using such rules. When stateful packet screening is used only those data packets, which are really part of an opened packet data connection, can be accepted.

Figure 2:
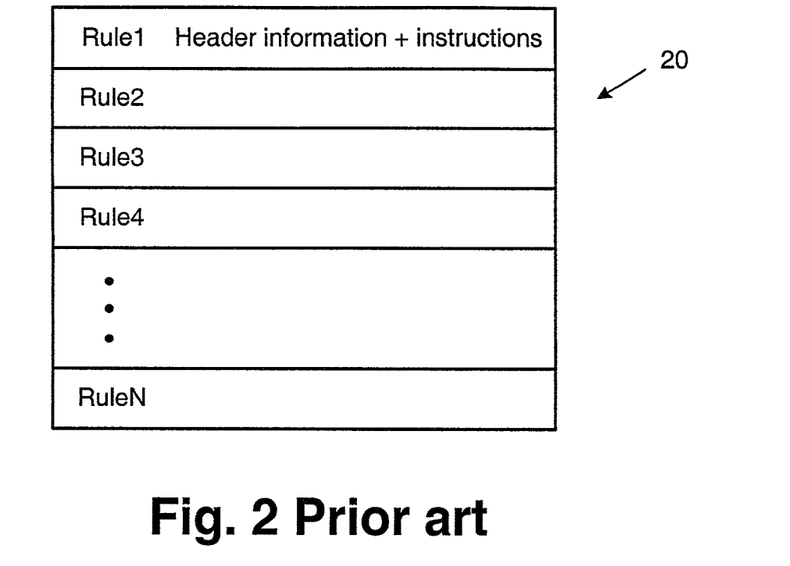
FIG. 2 illustrates a set of rules for screening data packets according to prior art.

The screening of first data packets in stateful screening is usually done using information specifying at least parts of allowed data packet headers and corresponding instructions for processing a data packet. The screening information is usually an ordered set of rules. FIG. 2 illustrates as an example a set 20 of rules, having a first rule Rule1, a second rule Rule2, and so forth. The order of the rules in the rule set typically defines the order in which a header of a data packet is compared to the rules. The instructions specified in the first rule, to which the header of a data packet matches, states the action to be carried out for said data packet. The rules are typically listed in a rule file in the order in which they are processed: a rule file thus typically comprises a sequence of rules Rule, Rule2, . . . , RuleN. The rule file is typically stored in a security gateway element, for example in security gateway 16.

A typical format for the rules is the following: header information, action. The header information typically involves source address (src), destination address (dst) and protocol (prot) relating to a data packet, and a rule typically has the following form: src, dst, prot, action. This means that for a data packet, which has the indicated header information, the indicated action is carried out. Typically the action defines whether the data packet is discarded or allowed to proceed. As a data packet is processed, its header information is compared to the header information indicated by the rules; the rules are processed in the order defined by the ordered set. Typically the last rule in the ordered set of rules (e.g. RuleN in FIG. 2) does not allow any packet to proceed. This means a data packet, whose header information does not match the header information indicated in any of the preceding rules, is discarded.

In stateful screening information about ongoing data packet connections or about packet data connections relating to ongoing connections is typically stored in a data structure, which is here called a connection data structure. A data packet initiating a packet data connection and arriving at a security gateway element, is compared to the screening information. If a rule allowing the data packet to traverse the security gateway element is found, a corresponding entry is made to the connection data structure. Typically, a connection data structure entry comprises some header information of the corresponding data packet and possibly further additional information. Data packets other than packets initiating a packet data connection are then compared to the connection data structure and, if a corresponding entry is found, the packet is allowed to traverse the security gateway element. Thus, only data packets relating to open packet data connections are accepted. As a further advantage, stateful screening may require less processing power than stateless screening, as data packets of an open packet data connection are checked only against the connection data structure, and there is no need to check if the data packets are in accordance with the given, possibly long, set of rules.

The part of the connection data structure that is related to one currently open packet data connection traversing a security gateway element is called an entry. When a packet data connection is closed, the corresponding entry is typically removed (or deleted or cleared) from the connection data structure. The number of entries having information about packet data connections thus typically varies as function of time.

Information about other data packets, which a security gateway element should allow to proceed, may also be dynamically updated to the connection data structure. In many cases a given set of rules is just basic information for making a decision about allowing a certain data packet to proceed. Additional information may also be needed. Consider, for example, FTP (File Transfer Protocol), which has a control connection and the files are transferred using a separate data connection. This separate data connection should be allowed even though a network element outside the local network initiates the FTP data connection, if a related control connection has been established and a request for opening the data connection has been detected within the control connection before the data connection is attempted. A security gateway element should thus be prepared to receive a data packet initiating such a FTP data connection and to allow such a data packet to proceed. Typically, such a data packet initiating a FTP data connection would not be allowed to proceed on the basis of the rules. It is only allowed on the basis of the prior information transferred within the FTP control connection.

Figure 3:
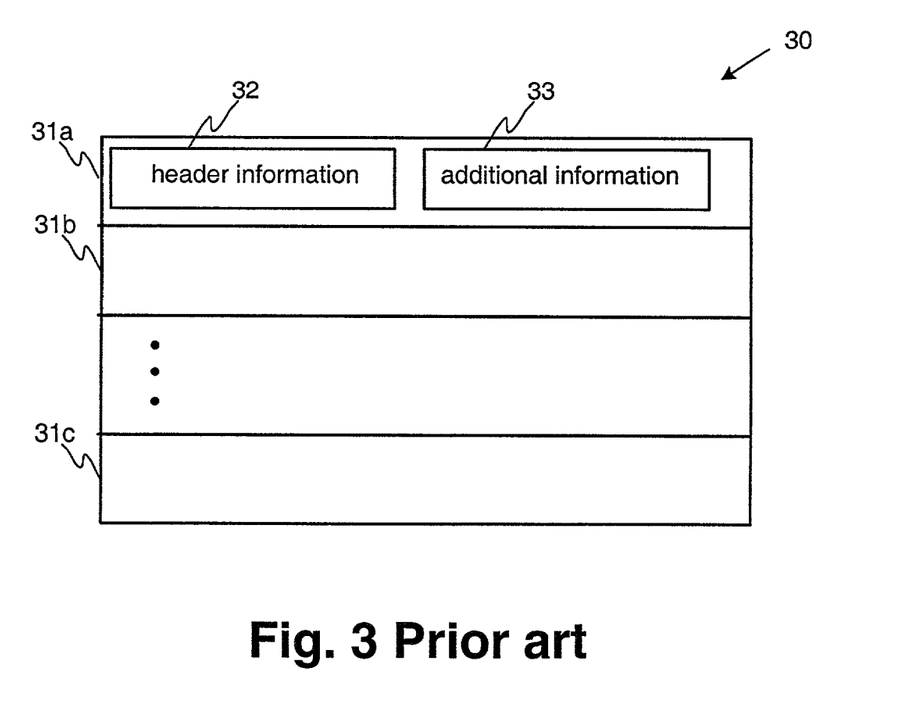
FIG. 3 illustrates a prior art connection data structure.

The connection data structure, where information about data packets that are allowed to arrive and be processed in a security gateway element, may be, for example, a connection data structure 30 described in FIG. 3. In the connection data structure 30 each entry 31 corresponds to a data packet having the header information 32 specified in the table entry. The header information 32 typically comprises the source address, the destination address, the source port and the destination port. A connection data structure entry typically comprises further additional information 33. This additional information may comprise information about the protocol to which the data packet relates. The protocol may be, for example, TCP (transmission control protocol) or UDP (User Datagram Protocol). Furthermore, the additional information may specify NAT (Network Address Translation) details, encrypting keys, routing information and/or a program code, which is used to investigate and optionally modify the contents of a data packet. Term protocol-specific program code is here used to refer to program code, which may be either a separate program, an integrate part of a kernel or a kernel module, and which is used to investigate and optionally modify the contents of data packets. A FTP-specific program code, for example, typically monitors the content of data packets relating to a FTP control connection, and when it finds out that a FTP data connection is to be established, it creates a connection data structure entry for the FTP data connection or otherwise informs the software running in the security gateway element to let data packets relating to said FTP data connection to proceed. There may be separate protocol-specific program codes for various protocols or application programs.

The set of rules, or other screening information, is updated every now and then. It may be updated, for example, periodically to ensure that too old screening information is not used. Alternatively, new screening information may be delivered to a security gateway element from a management system after the screening information has been modified, that is, new screening information is pushed to the security gateway element from the management system.

In current security gateway elements, when screening information is updated, a connection data structure is typically cleared. Clearing the connection data structure causes established connections to fail since the connection data structure entry which is required for accepting the packets other that the packet initiating a connection are lost. This is a problem especially in circumstances, where connections should be as reliable as possible.

A second way to handle ongoing packet data, when screening information is updated, is to maintain information about the open connections in the connection data structure. This way existing packet data connections survive, and the packet data connections are as reliable as possible. There may, however, be existing packet data connections which are not in accordance with the updated screening information, and this may cause security risks. Some security gateways give the user a possibility to select between dropping all existing packet data connections and allowing all existing packet data connections. Such a selection is a selection between security and network usability.

A further way to handle ongoing packet data connections when screening information is updated may have, for example, the following features. Before clearing a connection data structure, the connection data structure is copied to a previous connection data structure. The connection data structure is then cleared, and therefore all arriving data packets are handled using the updated screening information. Typically only data packets initiating a packet data connection may be compared to screening information. It is possible, however, to make an exception to this rule. In this case, all arriving data packets are compared to the screening information. If the updated screening information contains a rule allowing said data packet to pass but the packet is not a packet initiating a new connection, it is checked if the previous connection data structure contains an entry allowing the data packet to proceed. If such entry is found, an entry relating to this packet data connection is added to the connection data structure. These features prevent some existing packet data connections to be dropped. For example FTP data connection is, however, dropped, as it is accepted on the basis of the FTP control connection, not directly on the basis of a rule.

SUMMARY OF THE INVENTION

Object of the invention is to present a flexible method and arrangement for handling information about existing packet data connections in a security gateway element. A further object is to present such a method and arrangement for handling information about existing packet data connections which allows packet data connections via a security gateway element to be reliable even when screening information is updated.

Objects of the invention are achieved by classifying, after screening information is updated, packet data connections to packet data connections in accordance with new screening information and packet data connections in conflict with new screening information.

A method according to the invention is a method for handling information about packet data connections, which arrive at a security gateway element, in order to have in a connection data structure information about packet data connections in accordance with current screening information, said connection data structure comprising a number of entries representing a number of packet data connections, said method comprises the step of:

storing data packet header information about packet data connections, which are in accordance with first screening information, in said connection data structure, and receiving updated screening information, said updated screening information forming either by itself or in connection with said first screening information second screening information, and said method is characterized in that if further comprises the step of:

after receiving said updated screening information, comparing entries of said connection data structure to said second screening information, resulting in a classification of said entries as first entries, said first entries representing packet data connections in accordance with said second screening information, and as second entries, said second entries representing packet data connections in conflict with said second screening information.

A security gateway element according to the invention is a gateway element comprising
   means for processing data packets so that data packet connections in accordance with current screening information are allowed to proceed,
   means for storing first screening information used as current screening information,
   means for storing in a connection data structure information about packet data connections in accordance with the first screening information, and
   means for receiving updated screening information, which by itself or together with the first screening information forms second screening information, and the security gateway element is characterized in that it further comprises
   means for comparing entries in said connection data structure to second screening information, resulting in a classification of said entries as first entries, said first entries representing packet data connections in accordance with said second screening information, and as second entries, said second entries representing packet data connections in conflict with said second screening information.

The invention further relates to a management system relating to at least one security gateway element, said management system comprising
   means for defining screening information, and
   means for delivering screening information to said at least one security gateway element, and said management system being characterized in that if further comprises
   means for receiving from said at least one security gateway element information indicating all or some of packet data connections conflicting the delivered screening information,
   means for representing said information indicating all or some packet data connections to a user, said means arranged to produce a confirmation as a response to user actions, and
   means for sending said confirmation to said at least one security gateway element.

The invention relates also to a computer program comprising program code for performing all the steps of a method in accordance with the invention, when said program is run on a computer.

The invention further relates to a computer program product comprising program code means stored on a computer readable medium for performing a method according to the invention, when said program product is run on a computer.

A connection data structure according to the invention is a data structure comprising a number of entries representing a number of packet data connections, said entries comprising header information of data packets, and the connection data structure is characterized in that at least one of said entries further involves acceptance information relating to grounds for accepting the represented packet data connection to traverse a security gateway element.

Alternatively, a connection data structure according to the invention is a data structure comprising a number of entries representing a number of packet data connections, said entries comprising header information of data packets, said connection data structure being characterized in that at least one of said entries further comprises information indicating the current screening information at the time of creation of said entry.

The appended dependent claims describe some preferred embodiments of the invention. The features described in one dependent claim may be further combined with features described in another dependent claim to produce further embodiments of the invention.

The packet data connections discussed here are typically packet data connections on IP protocol. In this specification and in the appended claims, the term packet data connection refers here to a bi-directional flow of data packets. Examples of such packet data connections are TCP connections, bidirectional UDP packet fows, UDP queries, ICMP (Internet Control Message Protocol) queries and replies.

In this specification and in the appended claims, the term entry refers to a piece of information relating to one packet data connection. An entry typically comprises information at least about data packet headers. The term connection data structure refers to a data structure, whose entries represent packet data connections arriving at a security gateway. A connection data structure may be, for example, a table or a linked list or any other more versatile data structure.

According to the invention, packet data connections represented in a connection data structure are classified as packet data connections in accordance with updated screening information and as packet data connections in conflict updated screening information. After this classification it is possible to ensure that packet data connections in accordance with updated screening information are allowed to traverse a security gateway element. This is the main advantage of the invention. Furthermore, it is possible to inspect the packet data connections in conflict with updated screening information before possibly rejecting part or all of these packet data connections. This can be made, for example, by representing a list of existing packet data connections that are not allowed with new set of rules to the administrator, who can then decide if he or she wants to terminate those or not.

The screening information is typically a set of rules. It may be, for example, an ordered sequence of rules, and a data packet is processed by comparing header information of the data packet to the rules, rule by rule, in the order dictated by the sequence numbers. Alternatively, screening information may be a hierarchically ordered, so that a certain rule may have a number of subrules and, typically, header information common to all said subrules is specified in said certain rule. In this case data packets are compared to subrules only if the header information of a data packet matches first the header information specified in the rule, to which the subrules are subordinates.

BRIEF DESCRIPTION OF THE DRAWING

The invention is now described in more detail with reference to the accompanying drawing, where.

DETAILED DESCRIPTION OF THE INVENTION

FIGS. 1–3 are discussed in more detail above in connection with the prior art description.

Figure 4:
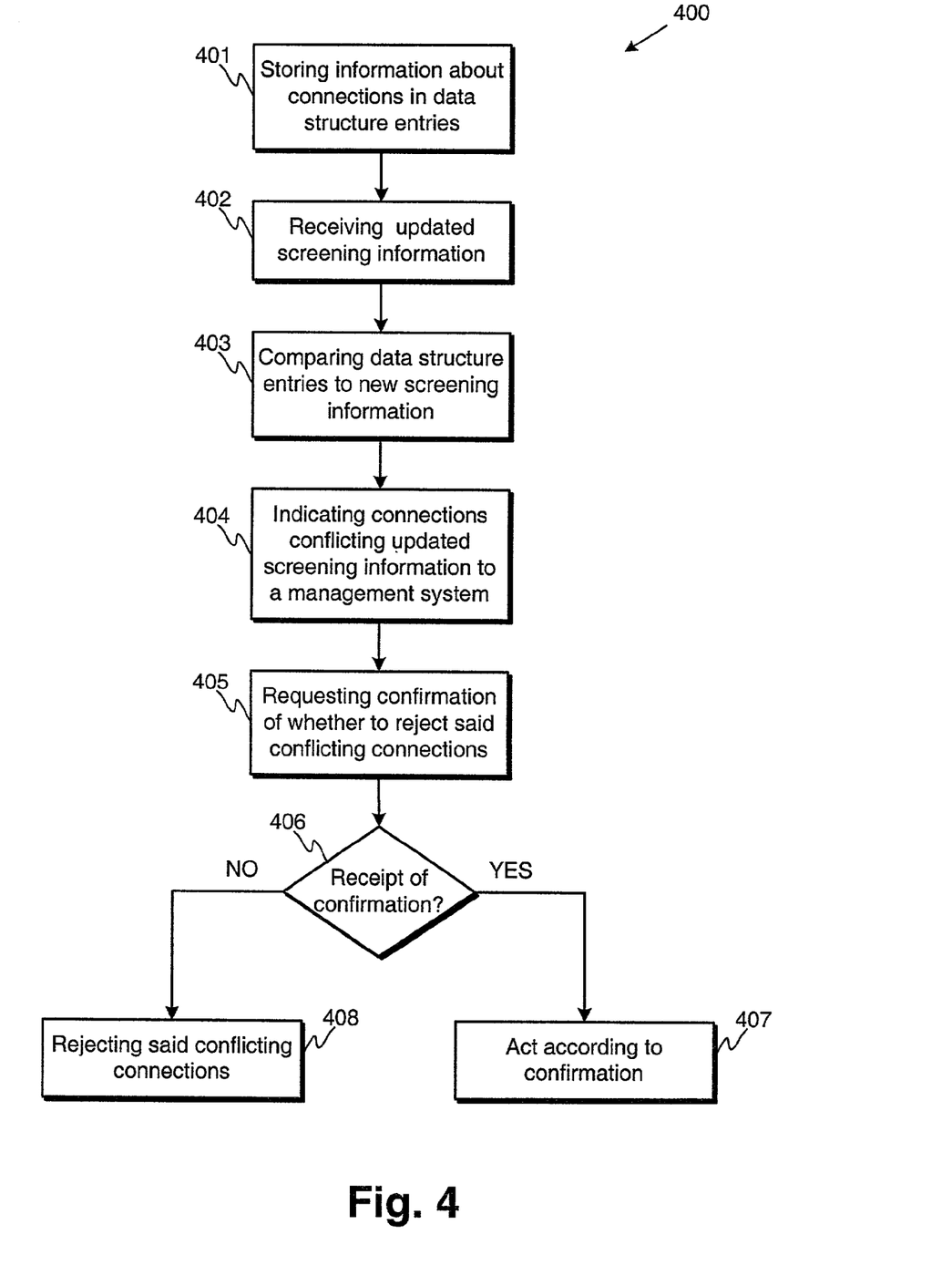
FIG. 4 illustrates as an example a flowchart of a method according to the invention, where interaction with a management system is involved.

FIG. 4 illustrates as an example a flowchart of a method 400, which is a method for handling information about packet data connections, which arrive at a security gateway element and which are in accordance with current screening information. In step 401, information about packet data connections, which are in accordance with first screening information, is stored in a connection data structure, said connection data structure consequently comprising a number of entries representing a number of existing packet data connections arriving at a security gateway element. In step 402, updated screening information is received. This updated screening information forms new (second) screening information on its own or together with the first screening information. Typically, this updated screening information is pushed from a management system. it is possible that a security gateway element asks for updated screening information if, for example, too long of a time has elapsed since it has received the latest update.

In step 403 entries of said connection data structure are compared to new (second) screening information. As a result, the entries are classified as first entries representing packet data connections in accordance with said second screening information or as second entries representing packet data connections in conflict with said second screening information.

Steps 404–406 relate to interaction between a management system and a security gateway element. In step 404, security gateway element indicates the packet data connections, which are mentioned in a connection data structure and which are conflicting with the new screening information. In step 405, a security gateway element requests, either implicitly by indicating the packet data connections in step 404 or explicitly, a confirmation whether to reject the conflicting packet data connections. A user of a management system may at this point decide, which packet data connections are rejected or, for example, if the entries corresponding to those packet data connections are modified. If a confirmation is received (step 406), the conflicting packet data connections and relating connection data structure entries are processed according to said confirmation. If a confirmation is not received, a security gateway element may, for example, reject the conflicting packet data connections. Typically data packets relating to conflicting packet data connections are allowed to proceed until a confirmation to reject those data packets is received or a timeout occurs.

Method 400 and especially the steps relating to interaction between a management system and a security gateway element are presented here as an example. The details of methods employed in management systems and security gateway elements in accordance with the invention may vary from those presented above.

Figure 5:
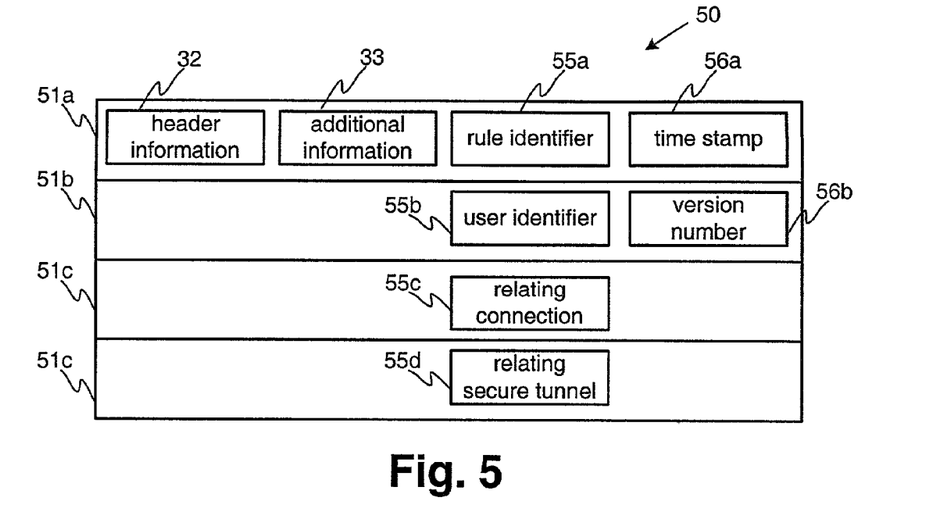
FIG. 5 illustrates as an example a connection data structure according to the invention.

FIG. 5 illustrates as an example a connection data structure 50 according to the invention. The connection data structure comprises information about packet data connections arriving at a security gateway element. In addition to header information 32 and additional information 33, which are discussed in more detail above in connection with prior art connection data structures and corresponding data structures, entry 51a of connection data structure 50 comprises acceptance information 55 relating to the grounds according to which the packet data connection represented by the entry 51a is allowed to traverse a security gateway element. This acceptance information may be, for example, a rule identifier 55a of that rule, according to which the packet data connection is allowed. Alternatively, it is possible that data packet connections are allowed, if the user (or process) opening the packet data connection is authenticated. This authentication may be performed in a variety of ways. In this case typically a user (process) identifier 55b of a validly authenticated user (process) may be stored in a connection data structure entry. Furthermore a packet data connection may be allowed, because a relating connection is allowed. This is the case for example, for FTP protocol, as described in connection with the description of prior art. In this case, information 55c indicating a relating rule is present in the connection data structure. This information may be part of the entry in a connection data structure, or the relating connection may be concluded from the structure of the connection data structure. For example, connections relating to a certain control connection may be represented by linking entries of said connections to the entry of the control connection. A further example of acceptance information is information 55d relating to a secure tunnel (a VPN tunnel) within which the data packet connection is.

Figure 6A:
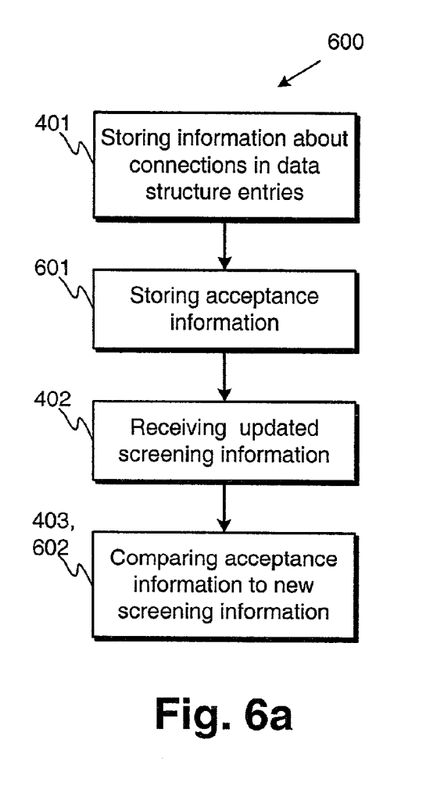
FIG. 6 illustrates as examples flowcharts of two methods according to the invention, where different information relating to existing packet data connections is compared to new screening information.

Typically all elements of a connection data structure 50 according to the invention comprise acceptance information 55, as illustrated in FIG. 5. FIG. 6a below illustrates a method, where a connection data structure according to the invention is used. Connection data structure entries may further or alternatively comprise information 56 indicating which version of the screening information was used when the connection data structure entry was created. This information 56 may be, for example, a time stamp 56a or a version number 56b of the screening information. FIG. 7b below illustrates a method where such information is useful.

FIG. 6 illustrates as examples flowcharts of two methods 600 and 610 according to the invention. In methods 600 and 610 different information, information which typically is stored in connection data structure entries, is compared to new (second) screening information. FIG. 6a illustrates method 600, where a connection data structure 50, for example, is used. The first step of method 600 is similar to step 401. In step 602 acceptance information relating to an entry is stored. This acceptance information is typically stored in the corresponding entry. In step 402 updated screening information is received, as in method 400. Thereafter, in step 602 (which is a more detailed description of step 403) acceptance information stored in connection data structure entries is compared to new (second) screening information.

If the acceptance information is a rule identifier, in step 602 it is typically checked that a rule having the same identifier is present also in the new (second) screening information and that it is not preceded by a rule inhibiting said packet data connection to be accepted based on the specific, identified rule. If the acceptance information is a user identifier, it typically implies that this specific user has been validly authenticated. Therefore it is checked if a rule allowing a packet data connection by the specified user is present in the new (second) screening information. If the acceptance information indicates a relating packet data connection, it is typically checked if the relating connection still exists and if it is allowed according to the new (second) screening information. If the acceptance information is a relating secure tunnel, e.g. a VPN tunnel, it is checked, if a rule allowing a connection using said specified tunnel is present in the new (second) screening information and if the encrypting methods are still valid.

Figure 6B:
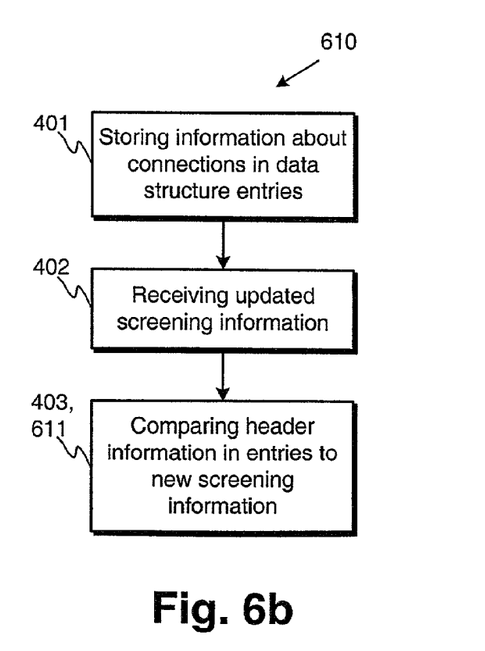

FIG. 6b illustrates method 610, where a prior art connection data structure or other connection data structure not specifying acceptance information may be employed. The first and second steps of method 600 are similar to steps 401 and 402 of method 400. In the third step 611, which is a more detailed description of step 403, header information stored in connection data structure is compared to new (second) screening information. The connection data structure entries may be treated similarly as data packets, which are processed in a security gateway element. The header information stored in a connection data structure entry is sufficient for this. If a rule (or other corresponding piece of screening information) in new (second) screening information allows a data packet having the header information specified in an entry to proceed, the entry is kept in the connection data structure, otherwise the entry is typically deleted.

In many cases, it is advantageous to use the method of FIG. 6a, in other words to store acceptance information relation to the packet data connections. This enhances especially the handling of more complicated protocols than, say, just plain TCP. For example, in case of FTP connection, the rule allowing the packet data connection covers both the control connection and the data connection, even though data connection is not allowed as such without the control connection. Nevertheless, it is possible to verify that also a certain FTP data connection is in accordance with the new screening information, if the rule that allowed the control connection relating to this certain FTP data connection is in accordance with the new screening information. This implies also to any other (complicted) protocols in which opening one or more connections requires that some other connection is opened first, or to any other connections that are not accepted purely on the basis of a rule, but require for example authentication.

FIG. 7 illustrates as examples flowcharts of two methods 700 and 710 according to the invention. In these methods different ways to carry out the comparison of the connection data structure entries are used.

Figure 7A:
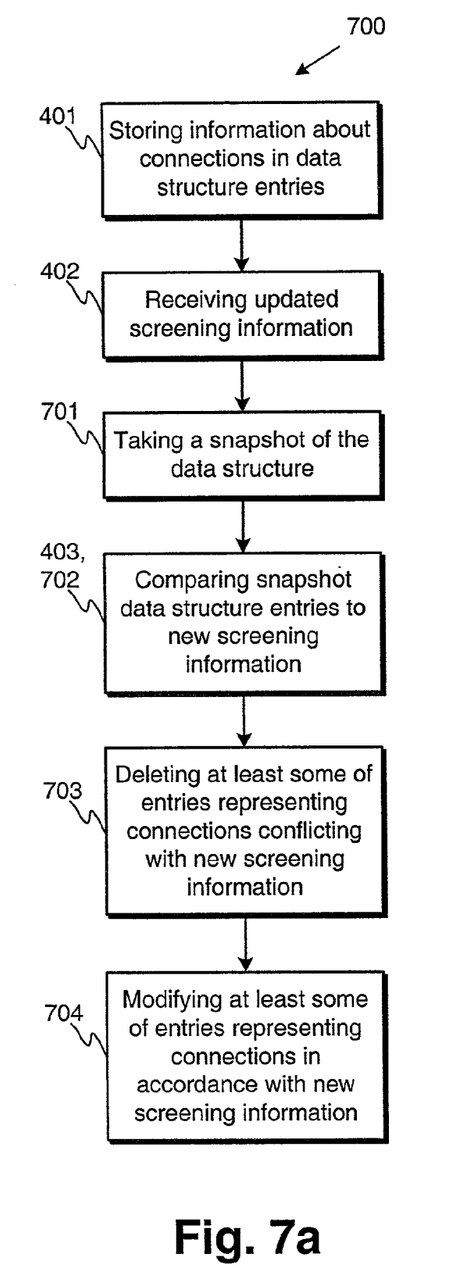
FIG. 7 illustrates as examples flowcharts of two methods according to the invention, where different ways to carry out the comparison are involved.
Figure 7B:
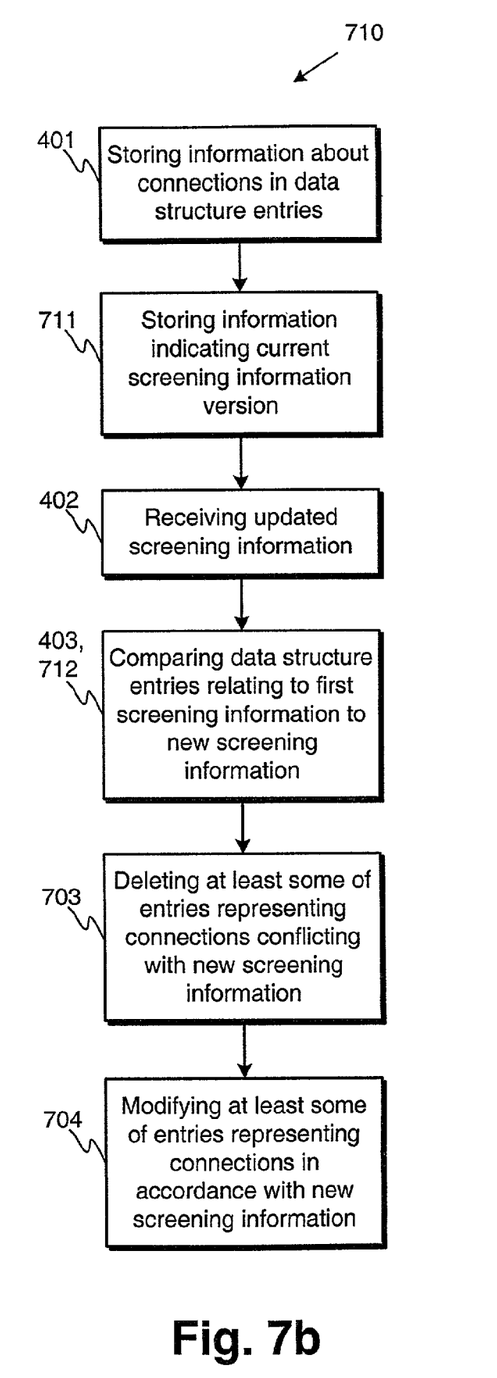

FIG. 7a illustrates method 700, where a snapshot of the connection data structure is taken (step 701) after receipt of updated screening information. The connection data structure may be, for example, a data structure to which a kernel process compares arriving data packets and which a kernel process updates. The snapshot may be, for example, taken so that the actual connection data structure is all the timeupdated by a kernel process (using, when needed, the new screening information), but another process (which may be a user process and which typically performs the comparing of connection data structure entries in step 403, 702) sees the contents of the connection data structure at a certain moment in time. At least some of the connection data structure entries, which represent packet data connections conflicting with the new screening information, are typically delted (step 703). It is possible that some of the connection data structure entries representing packet data connections in accordance with the new screening information are modified (step 704). If a connection data structure entry comprises, for example, information about an interface, via which data packets of said packet data connection arrive at the security gateway element, this information may be modified for example for enforcing a check according to new anti-spoofing settings.

The above example of providing a snapshot of a connection data structure to a user process is given as an example of implementing a method in accordance with the invention. Some operating systems have functionality to provide to various processes various views about a certain object.

In method 710, which is illustrated in FIG. 7b, the connection data structure entries are compared—one by one—to new (second) screening information. It is possible to make this comparison and allow entries to be added to the connection data structure at the same time. One way to do this is to store—typically to the connection data structure entries themselves—information about the screening information version, based on which an entry has been added to the connection data structure. This information is stored in step 711. In comparing connection data structure entries (step 403, 712), those entries which are based on the new screening information, need not be compared.

It is possible to interrupt the processing of those data packets, which do not initiate packet data connections, for the duration of the comparison in steps 403, 702, 712. This prevents data packets relating to packet data connections conflicting the new screening information from traversing the security gateway element. As the comparison typically takes only some milliseconds, a delay, which may be caused for data packets relating to packet data connections in accordance with the new screening information, is often practically negligible and should not affect these packet data connections.

The comparison (step 403) in methods 700 and 701 may be done, for example, by comparing header information stored in connection data structure entries to new screening information (cf. step 611) or by comparing acceptance information to new screening information (cf. step 602).

It is possible to combine the features presented in method 400 together with those features presented either in method 600 or 610 and/or together with those presented either in method 700 or 710. Additionally, it is not required to perform all the steps presented in the Figures in order to use the invention, but some of the steps may be optionally ignored. Furthermore, the order of the steps in Figures is not meant to be restrictive. For example, steps 702/712 and steps 703 and 704 may be performed in the order presented in Figures or, for example, by interleaving steps 712 and 703 so that after an entry conflicting new screening information is found, it is deleted and then a next entry conflicting new screening information is searched for. Similarly, steps 712 and 704 may be interleaved, as well as steps 702, 703 and 704.

Figure 8:
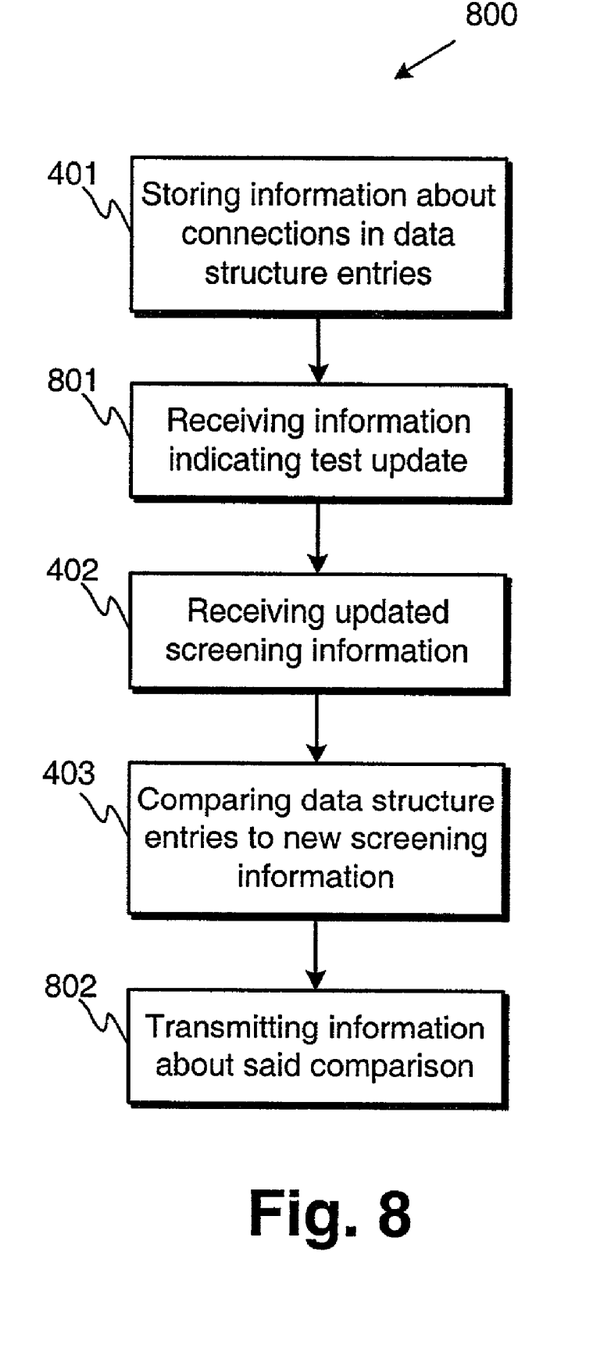
FIG. 8 illustrates as an example a flowchart of a method for testing validity of screening information update employing the invention.

FIG. 8 illustrates as an example a flowchart of a method 800 for testing validity of screening information update. In step 401 information about packet data connections is stored in a connection data structure. In step 801 information indicating that the next updated screening information is sent for testing purposes is received. After the updated screening information is received (step 402) and connection data structure entries are compared to the new screening information (step 403), information about said comparison is transmitted (step 802), for example, to a management system. This information may, for example, comprise a list of those packet data connections, which are in conflict with the new screening information. This method allows evaluation of the effect of certain updated screening information. This method need not involve an actual security gateway element and an actual management system, but it may be used, for example, in simulations.

Figure 9:
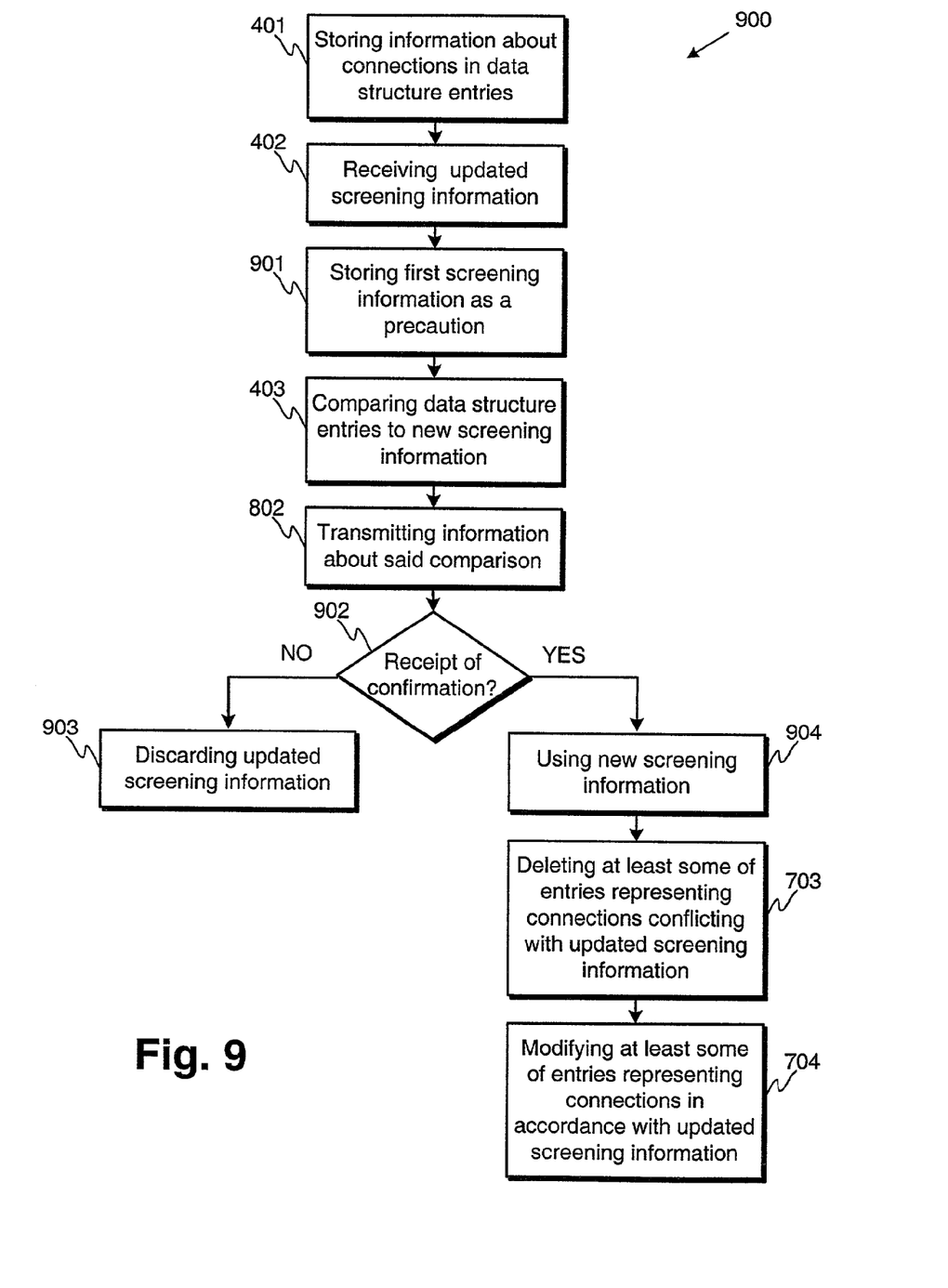
FIG. 9 illustrates as an example a flowchart of a method for updating screening information, said method employing the invention.

FIG. 9 illustrates as an example a flowchart of a method 900 for updating screening information. In this method first screening information is saved (step 901) as a precaution, to allow rejection of updated screening information. After comparing connection data structure entries to new screening information, information about the packet data connections conflicting new screening information, for example, is transmitted (step 802). Thereafter either a confirmation for taking the new screening information into use is received (steps 904, 703, 704) or the confirmation is not received and the updated screening information is discarded (step 903). In this case the first screening information is still used in accepting data packet connections.

Figure 10:
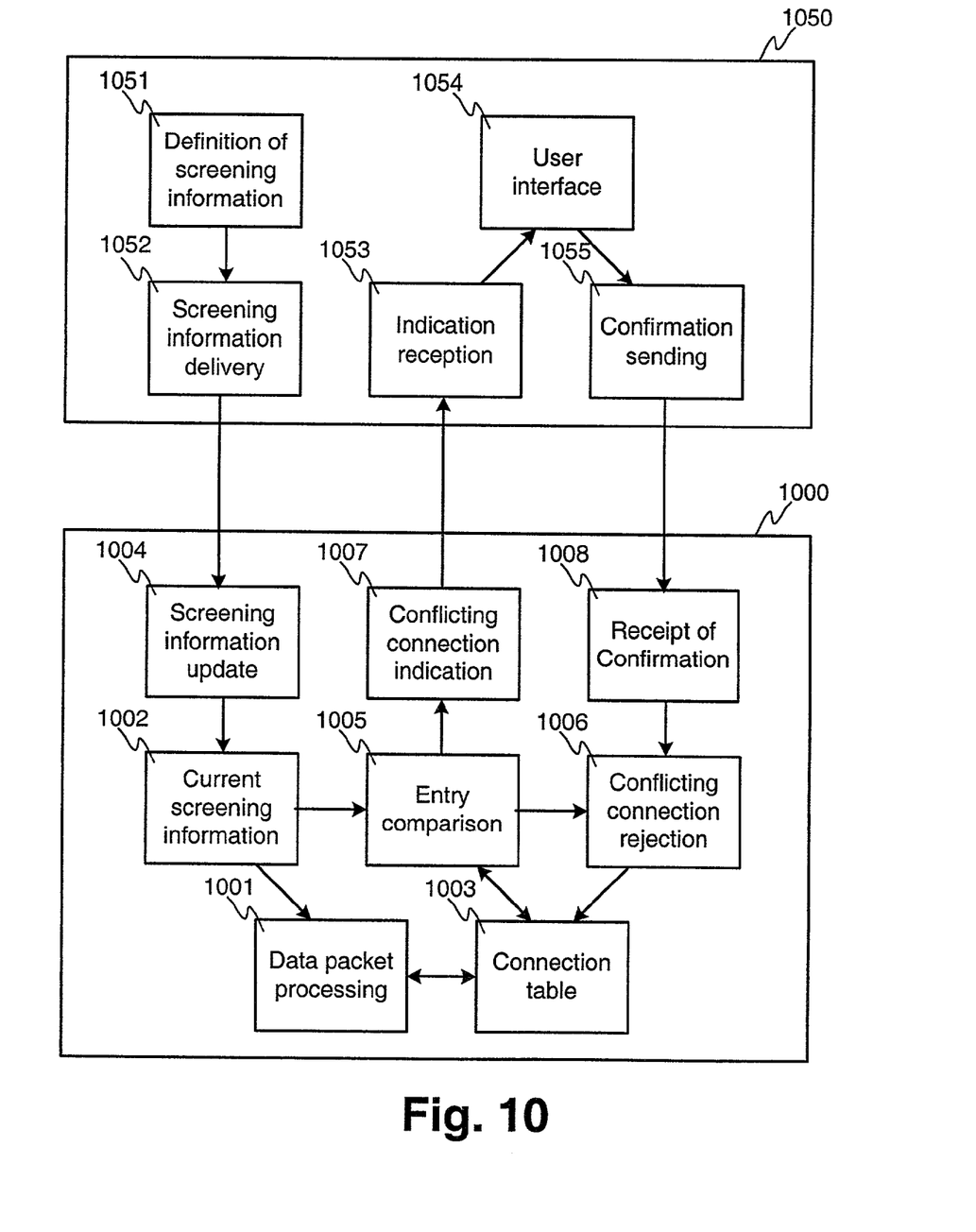
FIG. 10 illustrates as an example a security gateway element and a management system according to the invention.

FIG. 10 illustrates an example of a security gateway element according to the invention. The security gateway element 1000 comprises means 1001 for processing data packets so that data packet connections in accordance with current screening information are allowed to proceed. The current screening information is stored in means 1002, and typically screening information is a set of rules. Typically the means 1001 are arranged to compare a data packet first to entries in a connection data structure, where information about open packet data connections are stored, and only if a matching entry cannot be found, the data packet is compared to the current screening information. Typically, only data packets initiating a packet data connection are compared to the current screening information. Means 1003 are used for storing in the connection data structure information about current packet data connections in accordance with first screening information. The security gateway element 1000 further comprises means 1004 for receiving updated screening information, which by itself or together with the first screening information forms second screening information, which is to replace the first screening information currently stored in means 1002.

The security gateway element 1000 is characterized in that it further comprises means 1005 for comparing entries of said connection data structure to second screening information, thus classifying entries in said connection data structure as first entries, said first entries representing packet data connections in accordance with said second screening information, or as second entries, said second entries representing packet data connections in conflict with said second screening information.

The security gateway element 1000 further comprises means 1006 for rejecting packet data connections conflicting with new (second) screening informtion, for example by deleting or modifying some of said second entries from said connection data structure. The security gateway element 1000 typically further comprises means 1007 for indicating to a management system all or some of the packet data connections conflicting with the second screening information, and means 1008 for receiving a confirmation from the management system whether to reject all or some of the packet data connections conflicting with the second screening information. Furthermore, it is possible that said means 1006 for rejecting packet data connections are arranged to delete all packet data connections conflicting with the second screening information, if a confirmation is not received within a predefined period of time.

A security gateway element according to the invention may further comprise any of the following means:
means for receiving information indicating the receipt of test update screening information,
means for transmitting information about the comparison of existing connection data structure entries to new (second) screening information, said information about the comparison being typically a list of packet data connections conflicting with the new screening information,
means for storing first screening information as a precaution, and
means for receiving a confirmation to use updated screening information.

FIG. 10 illustrates also an example of a management system relating to at least one security gateway element. This management system 1050 comprises means 1051 for defining screening information, and means 1052 for delivering screening information to said at least one security gateway element. It further comprises means 1053 for receiving from said at least one security gateway element information indicating all or some of packet data connections conflicting with the delivered screening information. Means 1054 for representing said information indicating all or some packet data connections to a user actions. A management system 1050 typically comprises also means 1055 for sending confirmation to said at least one security gateway element.

A management system according to the invention may further comprise any of the following means in addition or alternatively to means 105–055:
means for sending information indicating the receipt of test updated screening information,
means for receiving information about comparison connection data structure entries to new (second) screening information, said information about comparison being typically a list of packet data connections conflicting the new screening information,
means for deciding on a use of updated screening information based at least on said information about comparison, and
means for sending a confirmation to use updated screening information.

A security gateway element according to the invention may be one network node or a cluster of network nodes. The means 100–008 and 105–055, or any other means mentioned in connection with FIG. 10 or in the appended claims, are typically implemented as a suitable combination of hardware and software. They are advantageously implemented using software program code means executed by a processor unit. A security gateway element according to the invention may employ any method according to the invention. Some examples of such methods are described above.

In the view of the foregoing description it will be evident to a person skilled in the art that various modification may be made within the scope of the invention. It should be apparent that many modifications and variations to the above described examples are possible, all of which fall within the true spirit and scope of the invention.

The invention claimed is:

1. A method for handling information about packet data connections, which arrive at a security gateway element, in order to have in a connection data structure information about packet data connections in accordance with current screening information, said connection data structure comprising a number of entries representing a number of packet data connections, said method comprising the steps of:
- storing data packet header information about packet data connections, which are in accordance with first screening information, in said connection data structure, and
- receiving updated screening information, said updated screening information forming either by itself or in connection with said first screening information second screening information,
- after receiving said updated screening information, comparing entries of said connection data structure to said second screening information, resulting in a classification of said entries as first entries, said first entries representing packet data connections in accordance with said second screening information, and as second entries, said second entries representing packet data connections in conflict with said second screening information.

2. A method according to claim 1 further comprising:
- storing for a packet data connection acceptance information relating to grounds for accepting that packet data connection,
- using said acceptance information is used in comparing entries of said connection data structure to said second screening information.

3. A method according to claim 2, wherein said acceptance information is stored to a same connection data structure entry as data packet header information about a packet data connection.

4. A method according to claim 2, wherein said screening information comprises a number of rules and said acceptance information is a rule identifier of that rule with which a packet data connection is in accordance.

5. A method according to claim 2, wherein said acceptance information is information identifying an authenticated entity.

6. A method according to claim 2, wherein said acceptance information is information identifying a relating packet data connection.

7. A method according to claim 6, wherein a specific form of said packet data connection data structure indicates said relating packet data connection.

8. A method according to claim 2, wherein said acceptance information is information identifying a secured tunnel, within which the packet data connection is tunneled.

9. A method according to claim 1, wherein, in comparing entries of said connection data structure to said second screening information, it is checked if packet data header information stored in said entries is in accordance with second screening information.

10. A method according to claim 1, further comprising:
- deleting at least one of said second entries from said connection data structure.

11. A method according to claim 1, further comprising:
- modifying at least one of said first entries in said connection data structure.

12. A method according to claim 1, further comprising:
- storing contents of said connection data structure at a certain time in order to use the stored contents in comparing of entries of said connection data structure.

13. A method according to claim 1, further comprising:
- storing in a connection data structure entry information indicating current screening information version at the time of adding a connection data structure entry, and comparing to second screening information, only entries of said connection data structure specifying first screening information as current screening information.

14. A method according to claim 1, further comprising:
- indicating to a management system all or some of the packet data connections conflicting the second screening information and represented by said the second entries, and
- requesting a confirmation from the management system whether to reject packet data connections conflicting said second screening information.

15. A method according to claim 14, wherein said packet data connections conflicting said second screening information are rejected after a predefined period of time in the absence of the confirmation by deleting relating entries of said connection data structure.

16. A method according to claim 1, further comprising:
- receiving information indicating that the second screening information is only for test use, and
- transmitting information about results of said comparison.

17. A method according to claim 1, further comprising:
- storing said first screening information as a precaution, enabling the return to using said first screening information as current screening information.

18. A method according to claim 1, further comprising:
- modifying said connection data structure based on said comparison.

19. A security gateway element comprising
- means for processing data packets so that data packet connections in accordance with current screening information are allowed to proceed,
- means for storing first screening information used as current screening information,
- means for storing in a connection data structure information about packet data connections in accordance with the first screening information, and
- means for receiving updated screening information, which by itself or together with the first screening information forms second screening information,
- means for comparing entries in said connection data structure to second screening information, resulting in a classification of said entries as first entries, said first entries representing packet data connections in accordance with said second screening information, and as second entries, said second entries representing packet data connections in conflict with said second screening information.

20. A security gateway element according to claim 19, wherein said means for processing data packets are arranged to compare data packets to said connection data structure, and wherein said security gateway element further comprises means for rejecting packet data connections in conflict with second screening information.

21. A security gateway element according to claim 20, further comprising
- means for indicating to a management system all or some of the packet data connections conflicting the second screening information, and
- means for receiving a confirmation from the management system whether to reject all or some of the packet data connections conflicting the second screening information.

22. A security gateway element according to claim 21, wherein said means for rejecting packet data connections are arranged to delete all packet data connections conflicting the second screening information, if a confirmation is not received within a predefined period of time.

23. A computer program product comprising program code means stored on a computer readable medium for performing when said program product is run on a computer, a process for handling information about packet data connections, which arrive at a security gateway element, in order to have in a connection data structure information about packet data connections in accordance with current screening information, said connection data structure comprising a number of entries representing a number of packet data connections, said process comprising routines of:

storing data packet header information about packet data connections, which are in accordance with first screening information, in said connection data structure, and receiving updated screening information, said updated screening information forming either by itself or in connection with said first screening information second screening information, after receiving said updated screening information, comparing entries of said connection data structure to said second screening information, resulting in a classification of said entries as first entries, said first entries representing packet data connections in accordance with said second screening information, and as second entries, said second entries representing packet data connections in conflict with said second screening information.

24. A computer program product according to claim 23 wherein connection data structure computer program product a number of entries representing a number of packet data connections, said entries comprising header information of data packets, wherein at least one of said entries further involves acceptance information relating to grounds for accepting the represented packet data connection to traverse a security gateway element.

25. A computer program product according to claim 24, wherein each entry of said connection data structure comprises entry-specific acceptance information.

26. A computer program product according to claim 24, wherein said acceptance information is a rule identifier of that rule with which a packet data connection is in accordance.

27. A computer program product according to claim 24, wherein said acceptance information is information identifying an authenticated entity.

28. A computer program product according to claim 24, wherein said acceptance information is information identifying a relating packet data connection.

29. A computer program product according to claim 24, wherein a specific form of said connection data structure indicates said relating packet data connection.

30. A computer program product according to claim 24, wherein said acceptance information is information identifying a secured tunnel, within which the packet data connections is tunneled.

31. A computer program product according to claim 23 wherein at least one of said entries further comprises information indicating the current screening information at the time of creation of said entry.

32. A computer program product according to claim 31, wherein said information indicating the current screening information at the time of creation of said entry is a time stamp.

33. A computer program product according to claim 31, wherein said information indicating the current screening information at the time of creation of said entry is a version identifier.

* * * * *